(12) United States Patent
Venkatesan et al.

(10) Patent No.: US 10,452,145 B2
(45) Date of Patent: Oct. 22, 2019

(54) SYSTEMS AND METHODS FOR HAPTICALLY-ENHANCED SMART HOME ARCHITECTURES

(71) Applicant: Immersion Corporation, San Jose, CA (US)

(72) Inventors: Srivatsav Venkatesan, Sunnyvale, CA (US); Graciela D. Franz, San Jose, CA (US); Kaniyalal Shah, Fremont, CA (US)

(73) Assignee: Immerson Corporation, San Jose, CA (US)

( * ) Notice: Subject to any disclaimer, the term of this patent is extended or adjusted under 35 U.S.C. 154(b) by 0 days.

(21) Appl. No.: 15/350,505

(22) Filed: Nov. 14, 2016

(65) Prior Publication Data

US 2018/0136726 A1    May 17, 2018

(51) Int. Cl.
| | | |
|---|---|---|
| *G06F 3/01* | (2006.01) | |
| *G05B 19/409* | (2006.01) | |
| *G06F 3/041* | (2006.01) | |
| *H04L 12/28* | (2006.01) | |
| *H04L 12/26* | (2006.01) | |

(52) U.S. Cl.
CPC ............ *G06F 3/016* (2013.01); *G05B 19/409* (2013.01); *G06F 3/041* (2013.01); *H04L 12/2803* (2013.01); *G05B 2219/25011* (2013.01); *H04L 12/2809* (2013.01); *H04L 43/0817* (2013.01)

(58) Field of Classification Search
CPC ....... G06F 3/016; G06F 3/041; G05B 19/409; G05B 2219/25011; H04L 12/2803; H04L 12/2809; H04L 43/0817
See application file for complete search history.

(56) References Cited

U.S. PATENT DOCUMENTS

| | | | | |
|---|---|---|---|---|
| 2004/0004546 | A1* | 1/2004 | Ando | E05B 45/06 340/541 |
| 2006/0038781 | A1* | 2/2006 | Levin | G06F 3/016 345/163 |
| 2013/0268129 | A1* | 10/2013 | Fadell | G06Q 10/20 700/278 |

(Continued)

FOREIGN PATENT DOCUMENTS

| | | |
|---|---|---|
| EP | 2778847 A2 | 9/2014 |
| WO | 2016/001338 A1 | 1/2016 |

OTHER PUBLICATIONS

EP 17201721.2, "Extended European Search Report", dated Mar. 9, 2018, 9 pages.

(Continued)

*Primary Examiner* — Brent D Castiaux
(74) *Attorney, Agent, or Firm* — Kilpatrick Townsend & Stockton LLP (57) ABSTRACT

The present disclosure relates to systems and methods for haptically-enhanced smart home architectures. For example, one disclosed method includes determining a building component condition of a building component; determining an interaction with a control device in the building, the control device associated with the component of the building and comprising a haptic output device; determining a haptic effect based on the building component condition; and transmitting a signal to the haptic output device to cause the haptic output device to output the haptic effect.

20 Claims, 9 Drawing Sheets

(56) References Cited

U.S. PATENT DOCUMENTS

| 2014/0218184 | A1* | 8/2014 | Grant | G08B 6/00 |
| | | | | 340/407.1 |
| 2015/0109104 | A1* | 4/2015 | Fadell | G08B 27/003 |
| | | | | 340/5.65 |
| 2016/0261425 | A1* | 9/2016 | Horton | G05B 15/02 |

OTHER PUBLICATIONS

MacLean et al., "Aladdin: Exploring Language with a Haptic Door Knob", Interval Technical Report #199-058, Retrieved from the Internet: URL:https://pdfs.semanticscholar.orgjce53/f17656b234ee74b38a7535e0d4d7e0100838.pelf [retrieved on Feb. 28, 2018], Jan. 1, 1999, pp. 1-10.

MacLean et al., "Smart Tangible Displays in the Everyday World: A Haptic Door Knob", Advanced Intelligent Mechatronics, 1999, Proceedings, 1999 IEEE/Asme International Conference on Atlanta, Retrieved from the Internet: URL:http://citeseerx.ist.psu.edu/viewdoc/summarydoi=1 0.1.1.21.1213 [retrieved on Jun. 8, 2011], XP002640738, Sep. 19, 1999, pp. 1-6.

* cited by examiner

SYSTEMS AND METHODS FOR HAPTICALLY-ENHANCED SMART HOME ARCHITECTURES

FIELD

The present application relates to haptic feedback and more specifically relates to haptically-enhanced smart home architectures.

BACKGROUND

Modern homes are increasingly being equipped with technology that monitors or controls the status of the home. For example, thermostats for heating and air conditioning systems may be accessible remotely through an internet connection. Similarly, home alarm systems provide internet access to various status information, such as motion sensors, door sensors, alarm information, etc.

SUMMARY

Various examples are described for systems and methods for haptically-enhanced smart home architectures. One disclosed method includes the steps of determining a building component condition of a building component of a building; determining an interaction with a control device of the building, the control device associated with the building component and comprising a haptic output device; determining a haptic effect based on the building component condition; and transmitting a signal to the haptic output device to cause the haptic output device to output the haptic effect.

In another example, a disclosed system includes a sensor associated with a building component of a building; a control device associated with the building component and comprising a haptic output device; a memory; and a processor in communication with the memory, the sensor, and the control device, the processor configured to execute processor-executable instructions stored in the memory to: determine a building component condition; determine an interaction with the control device; determine a haptic effect based on the building component condition; and transmit a signal to the haptic output device to cause the haptic output device to output the haptic effect.

A further example includes a non-transitory computer-readable medium comprising processor-executable program code configured to cause a processor to: determine a building component condition of a building component of a building; determine an interaction with a control device of the building, the control device associated with the building component and comprising a haptic output device; determine a haptic effect based on the building component condition; and transmit a signal to the haptic output device to cause the haptic output device to output the haptic effect.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 6A-9B show example control devices for haptically-enhanced smart home architectures;

DETAILED DESCRIPTION

Examples are described herein in the context of systems and methods for haptically-enhanced smart home architectures. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Systems and Methods for Haptically-Enhanced Smart Home Architectures In this example, a person has installed a variety of interconnected sensors and computing devices in her home to monitor and control the status of various aspects of her home. For example, she has installed door and window sensors on the exterior doors and windows to sense the respective door's or window's status, such as to indicate when one has been opened or shut. In addition, a computing device is connected to each of these door sensors to obtain sensor information and to monitor the status of each exterior door and window. In addition, each of the light switches in the house is connected to a computing device that can sense the state of the light switch, based on a current flow, whether on, off, or a degree of dimming.

As the user arrives home in the evening after work, she presses her thumb against a sensor that detects her thumbprint and, upon verifying her identity, unlocks the front door. When the user grasps the door handle, the door handle outputs a haptic effect of three short duration, high magnitude vibrations to indicate that all other doors in the house are locked, no security breaches have been detected during the day, and no motion sensor activity is detected. Thus, before entering her home, she is provided with information to indicate that it is safe to enter. So she enters the home, puts her laptop bag and mail on a table in the entryway and presses a button to turn on a preset set of light fixtures, which illuminate the entry way, the kitchen and the living room. While she is pressing the button, however, the button outputs a haptic effect indicating that a lightbulb in the living room has burned out. She goes into the kitchen and opens the pantry door, at which time the pantry door handle outputs a haptic effect indicating that the front door has been left open. So she finds a replacement light bulb, closes the pantry door, returns to the entryway, and closes the front door. She then moves to the living room and replaces the light bulb. Thus, the home is able to provide the owner or other occupant with unobtrusive status information about the home in an intuitive way and without requiring the occupant to access web page or smartphone application to inspect the home's status.

This illustrative example is given to introduce the reader to the general subject matter discussed herein and the disclosure is not limited to this example. The following sections describe various additional non-limiting examples and examples of systems and methods for systems and methods for haptically-enhanced smart home architectures.

Figure 1:
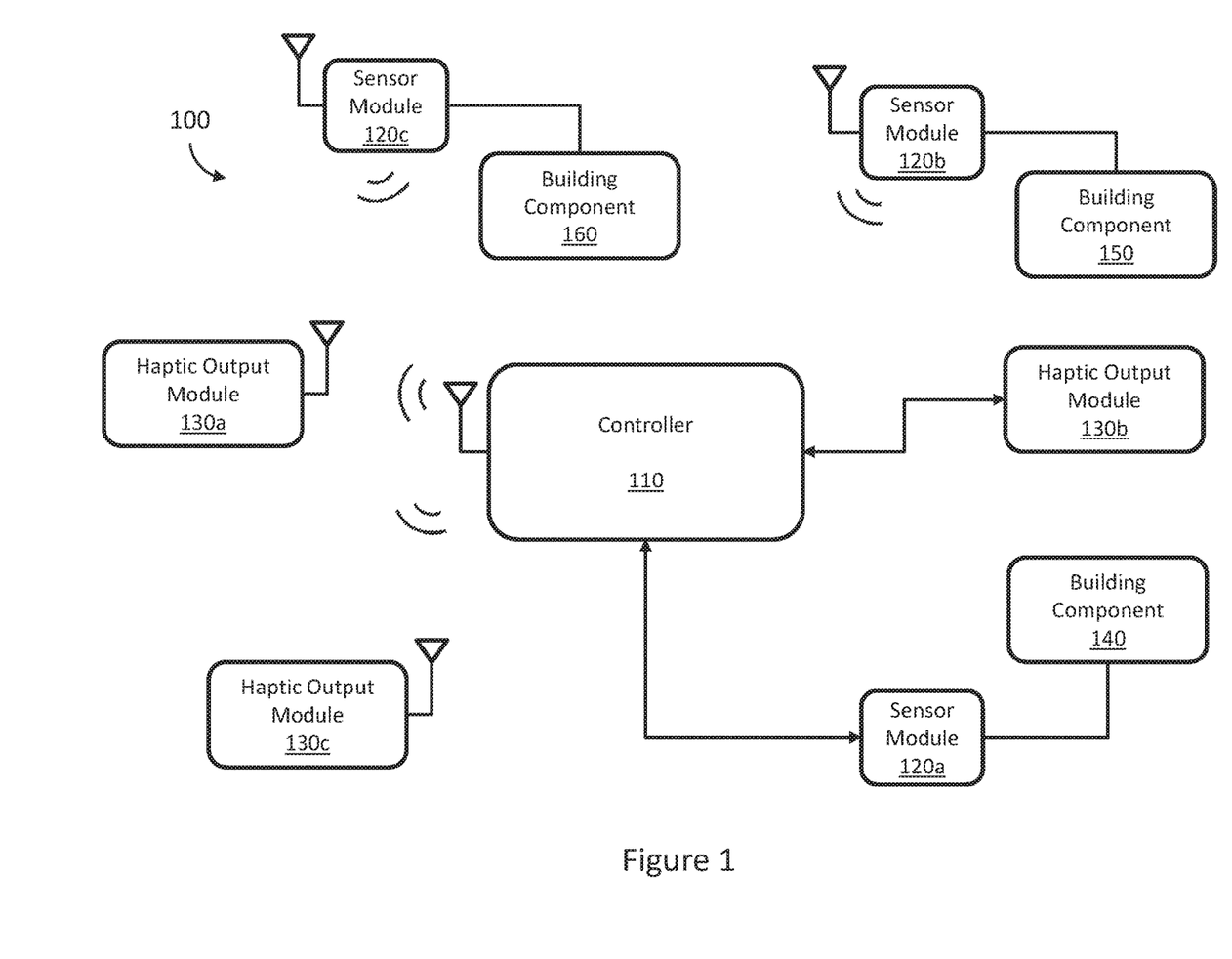
FIG. 1 shows an example system for haptically-enhanced smart home architectures.

Referring now to FIG. 1, FIG. 1 shows an example system 100 for a haptically-enhanced smart home architecture. The system 100 includes a controller 110, several sensor modules 120a-c, and several haptic output modules 130a-c. The controller 110 in this example is a computing device that is described in more detail with respect to FIG. 10. The controller 110 communicates with the various sensor modules 120a-c to obtain information about various aspects of a building. In this example, the building is a house, though in various examples according to this disclosure, the building may be an apartment or apartment building, a hotel room or hotel, a condominium or condominium building, a retail or commercial building, an industrial building, a factory, or any other suitable building.

In addition to receiving sensor information from sensor modules 110, the controller 110 also transmit signals to the haptic output modules 130a-c that may cause the haptic output modules 130a-c to output one or more haptic effects, as will be described in more detail with respect to FIG. 4 below. Haptic output modules 130a-c may be installed in, or associated with, various control devices within the building. For example, haptic output modules 130a-c may be installed in, or associated with, door knobs, faucets, toilet handles, light switches, thermostats, or other devices within a building that control or manipulate components of the building. Such an arrangement may allow the haptic output modules 130a-c to provide haptic effects to such control devices when a person is contacting them to provide haptic notifications, but otherwise not output haptic effects.

The sensor modules 120a-c sense states of various components 140-160 of the house and transmit sensor information to the controller 110. The components 140-160 may be any of a variety of things, such as doors or windows, both interior or exterior; light switches; lights; appliances, such as stoves, ovens, refrigerators, etc.; or televisions or home theater equipment. In some examples components 140-160 may be a heating/ventilation/air conditioning ("HVAC") system; an alarm system or alarm system control panel; or a plumbing system, e.g., one or more faucets, toilets, showers, pipes, etc. Such components 140-160 may relate to the consumption of energy or other resources for which owners or occupants of the building may pay for. For example, windows and doors may affect the use of electricity by an HVAC system based on whether they are open or closed, while faucets or other fixtures or appliances that use water may be left on or may leak water. Similarly appliances that are left on, e.g., TVs, stoves, etc., may consume electricity or other resources (e.g., natural gas), or may even present a safety hazard if left on. Thus, the sensor modules 120a-c can monitor the states of such appliances and provide information to the controller 110.

Figure 2:
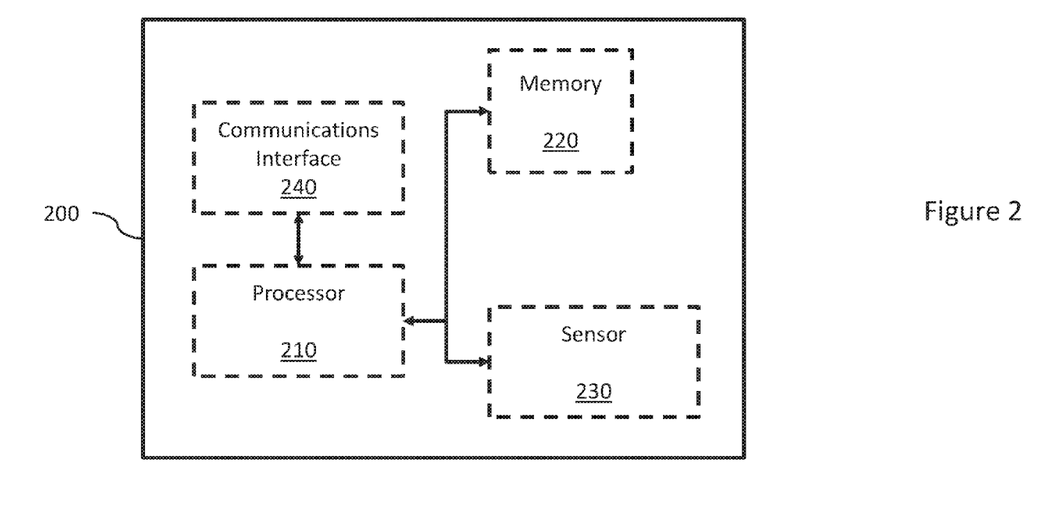
FIGS. 2-3 show example sensor modules for haptically-enhanced smart home architectures.

Referring now to FIG. 2, FIG. 2 shows an example sensor module 200 for haptically-enhanced smart home architectures. In this example, the sensor module 200 includes a processor 210, a memory 220, a sensor 230, and a communications interface 240. The processor 210 receives sensor signals from the sensor 230 and transmits sensor information to the controller 110 using the communications interface 240. In some examples, the processor 210 may also store sensor information or other information in the memory 220, such as sensor calibration parameters, or historical data. The sensor module 200 in this example is powered by a battery (not shown), but in some examples, the sensor module 200 may be connected to an external power supply, such as electrical wiring within the building.

The sensor module 200 provides sensor information to the controller 110 based on sensor signals from the sensor 230. Suitable sensors 230 for use in this example include voltage or current sensors, magnetic contact or proximity sensors (e.g., for door and window sensors), temperature sensors (e.g., thermocouples, thermistors, etc.), flow rate sensors, motion sensors, etc. Some types of sensors, such as motion sensors, may be employed and associated with components of a building, e.g., a home theater system, to determine whether one or more persons are interacting with the component. In some examples, a sensor module 200 may include multiple sensors 230 of the same or different types.

In this example, the sensor module 200 employs a wireless communications interface 240 to communicate with the controller 110; however, any suitable communications interface may be employed, including wired or wireless communication interfaces. Suitable wireless interfaces include Bluetooth, WiFi, or cellular, while suitable wired interfaces include Ethernet, serial connections (e.g., RS-232 or RS-422), or a voltage or current signal. While the example sensor module 200 shown in FIG. 2 has only one communications interface 240, other example sensor modules 200 may have multiple communications interfaces, e.g., to support both wired and wireless communications, or for different types of wired or wireless communications.

In some examples, such as in a large building or building complex, wireless sensor modules may employ a mesh networking architecture. Such an architecture may allow sensor modules distant from a controller 110 to communicate with the controller 110 via other sensor modules within the building or site using relatively low power radio communications.

The processor 210 receives one or more sensor signals from the sensor 230, which provide sensor information to the processor 210. Such sensor signals may be digital or analog sensor signals, and the processor 210 may receive and store information encoded within the sensor signals. For example, a digital sensor signal may include bit patterns or a pulse-width modulated ("PWM") signal indicating sensor information, such as a current or voltage value. An analog sensor signal may provide a voltage or current level that the processor receives, e.g., via an analog-to-digital converter ("ADC"). The processor 210, after receiving a sensor signal and decoding sensor information within the sensor signal, may then immediately transmit some or all of the sensor information to the controller 210, or it may store some or all of the sensor information in memory 220. In some examples where the processor 210 stores sensor information in memory 220, the processor 210 may periodically provide sensor information to the controller 110, e.g., at a rate specified by the controller 110. In some examples, however, the processor 210 may only transmit sensor information to the controller 110 in response to a request for sensor information.

In addition to transmitting sensor information to the controller 110, the processor 210 may also receive information from the controller 110. For example, the controller 110 may change an activation state of the sensor module 200. In one example, the controller 110 may deactivate a sensor module 200 in response to receiving a low battery indication from the sensor module 200, or it may change a sensitivity of a sensor 230 or provide updated or default calibration parameters for a sensor 230.

Figure 3:
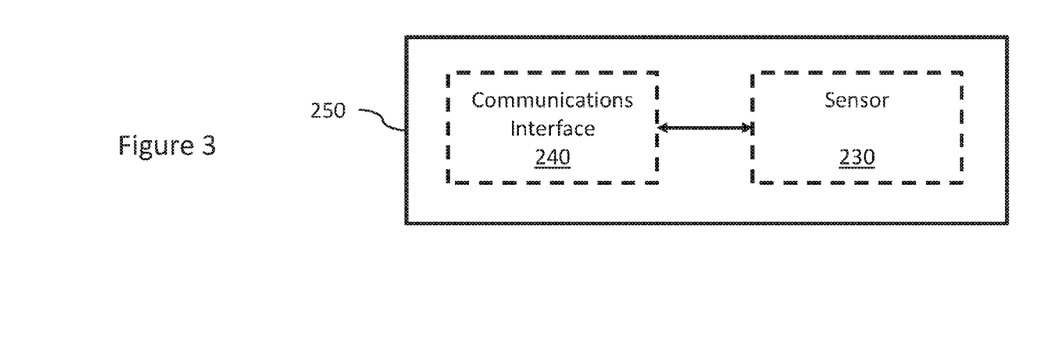

It should be appreciated while a sensor module 120a-c may comprise the example sensor module 200 shown in FIG. 2, other examples of sensor modules may be employed. For example, referring to FIG. 3, FIG. 3 shows another example sensor module 250. In this example, the sensor module 250 includes a sensor 230 and a communications interface 240, but does not include a separate processor or memory. Instead, the sensor 230 transmits sensor signals to the controller 110 via the communications interface 240, and may receive signals from the controller 110, such as calibration parameters, or activation commands.

Referring again to FIG. 1, as discussed above, the controller 110 receives sensor signals from the sensor modules 120a-c via wireless or wired communications interfaces. As can be seen in FIG. 1, sensor modules 120b-c communicate wirelessly with the controller 110, while sensor module 120a communicates via a wired connection with the controller 110. Further, as discussed above, the controller 110 communicates with the haptic output modules 130a-c to transmit signals to the haptic output modules 130a-c to cause the haptic output modules 130a-c to output one or more haptic effects.

Figure 4:
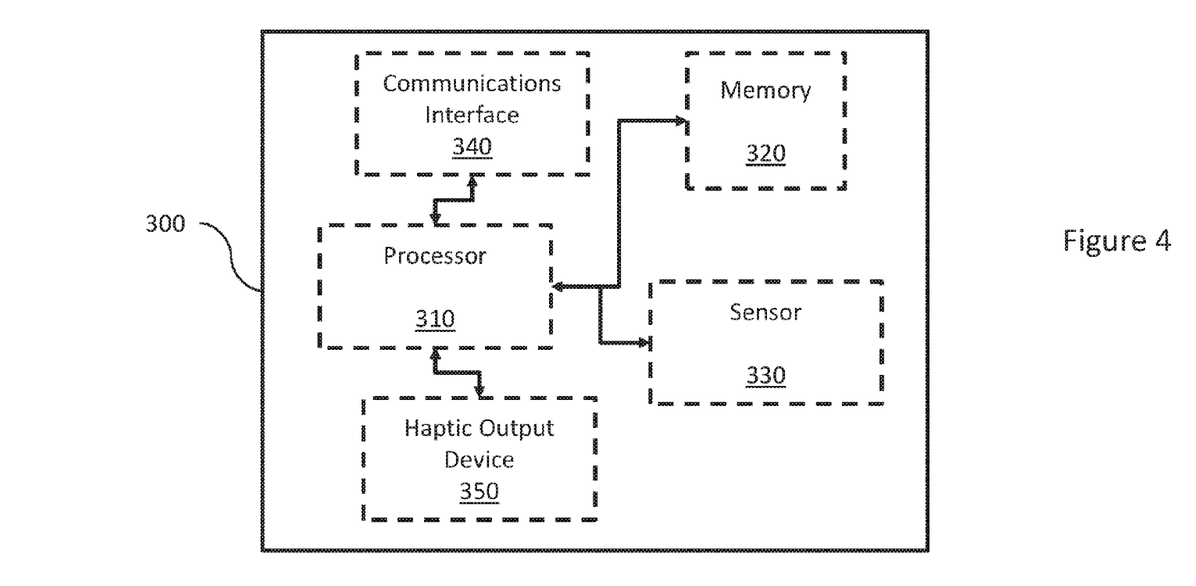
FIG. 4-5 shows an example haptic output module for haptically-enhanced smart home architectures.

Referring now to FIG. 4, FIG. 4 shows an example haptic output module 300. The haptic output module 300 includes a processor 310, a memory 320, a sensor 330, a communications interface 340, and a haptic output device 350. In this example, the processor 310 receives signals from the controller 110 via the communications interface 340 and generates one or more haptic signals to cause the haptic output device 350 to output one or more haptic effects. Examples of suitable communications interfaces 340 were discussed above with respect to the communications interface 240 shown in FIG. 2.

The sensor 330 provides sensor signals to the processor 310 indicating contact with, or proximity to, the haptic output module 300 or a manipulandum (or control device), such as a door knob, light switch, faucet, etc. In this example, the processor 310 only generates and transmits haptic signals to the haptic output device 350 if the sensor 330 provides sensor signals indicating contact with the haptic output module 300 or an associated control device. Suitable sensors 330 for a haptic output module 300 may include contact sensors, such as resistive or capacitive touch sensors; proximity sensors, such as capacitive or inductive proximity sensors, or motion sensors; pressure sensors; rotational encoders; strain gages; piezoelectric elements; etc. The sensor 330 provides one or more sensor signals to the processor 310, which may determine whether a person is contacting the control device associated with the haptic output module 350. The processor 310 may maintain a parameter, such as a flag, indicating whether a person is contacting or manipulating the control device.

Examples according the present disclosure may employ one or more different types of haptic output devices. Examples of suitable haptic output devices include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include other devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

In other examples, deformation of one or more components can be used to produce a haptic effect. For example, one or more haptic effects may be output to change the shape of a surface or a coefficient of friction of a surface. In an example, one or more haptic effects are produced by creating electrostatic forces and/or ultrasonic forces that are used to change friction on a surface. In other examples, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some examples comprising haptic output device 350 that are capable of generating frictional or deformation effects, the haptic output device 350 may be overlaid on a contact surface of the control device such that the frictional or deformation effects may be applied to a surface that is configured to be touched by a user. In some examples, other portions of the system may provide such forces, such as portions of the housing that may be contacted by the user or in a separate touch-separate input device coupled to the system.

It will be recognized that any type of input synthesis method may be used to generate the interaction parameter from one or more haptic effect signals including, but not limited to, the method of synthesis examples listed in table 1 below.

TABLE 1

METHODS OF SYNTHESIS

| Synthesis Method | Description |
| --- | --- |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |

TABLE 1-continued

METHODS OF SYNTHESIS

| Synthesis Method | Description |
| --- | --- |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

And while the example haptic output module 300 shown in FIG. 4 includes only one haptic output device 350, some example haptic output modules may include more than one haptic output device 350 or more than one type of haptic output device 350. Further, in some examples, the haptic output module 300 may include other components, such as a speaker, which may output audio signals, such as beeps or voiced alerts (e.g., synthesized or pre-recorded voice alerts) regarding a condition of a building component.

It should be appreciated that in some examples, a haptic output module 300 may operate as both a haptic output module 300 and as a sensor module 200. For example, the sensor 330 may provide one or more sensor signals to the controller 110 indicating a condition of a component, e.g., a flow rate of water through a faucet, as well as a manipulation of a control device, e.g., a movement of a faucet handle.

Figure 5:
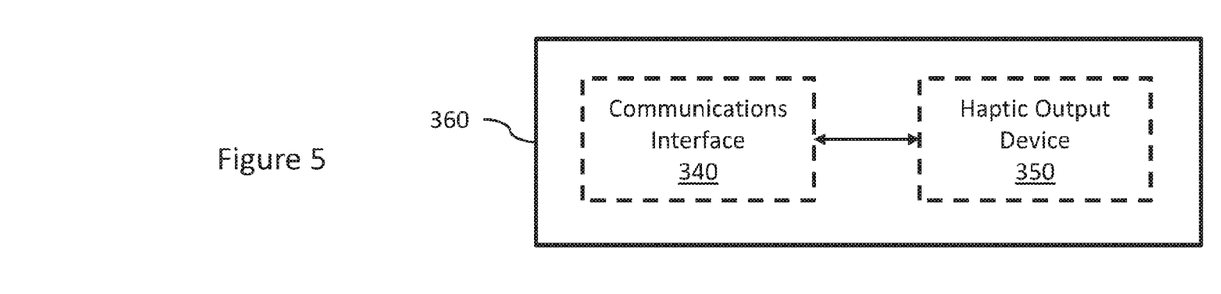

It should be appreciated while a haptic output module 130a-c may comprise the example haptic output module 300 shown in FIG. 4, other examples of haptic output modules may be employed. For example, referring to FIG. 5, FIG. 5 shows another example haptic output module 360. In this example, the haptic output module 360 includes a haptic output device 350 and a communications interface 540, but does not include a separate processor or memory. Instead, the controller 110 transmits signals to the haptic output device 350 via the communications interface 340. Further, the controller 110 may receive signals from the haptic output device 350, e.g., in examples where the haptic output device 350 is capable of sensing information, such as rotation of or contact with the haptic output device 350.

As discussed above, various control devices may comprise one or more haptic output modules 300. Referring to FIGS. 6A-9B, each of these figures shows an example control device having a haptic output module 300.

Figure 6A:
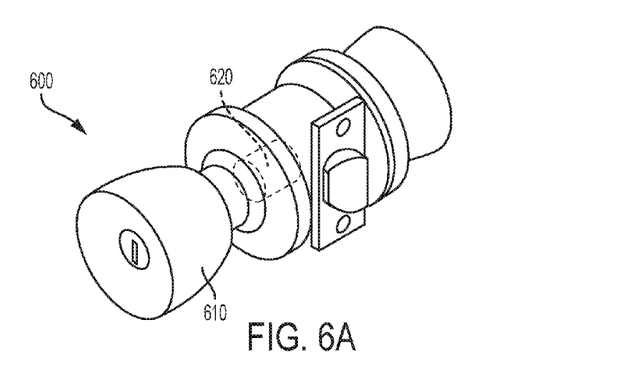
Figure 6B:
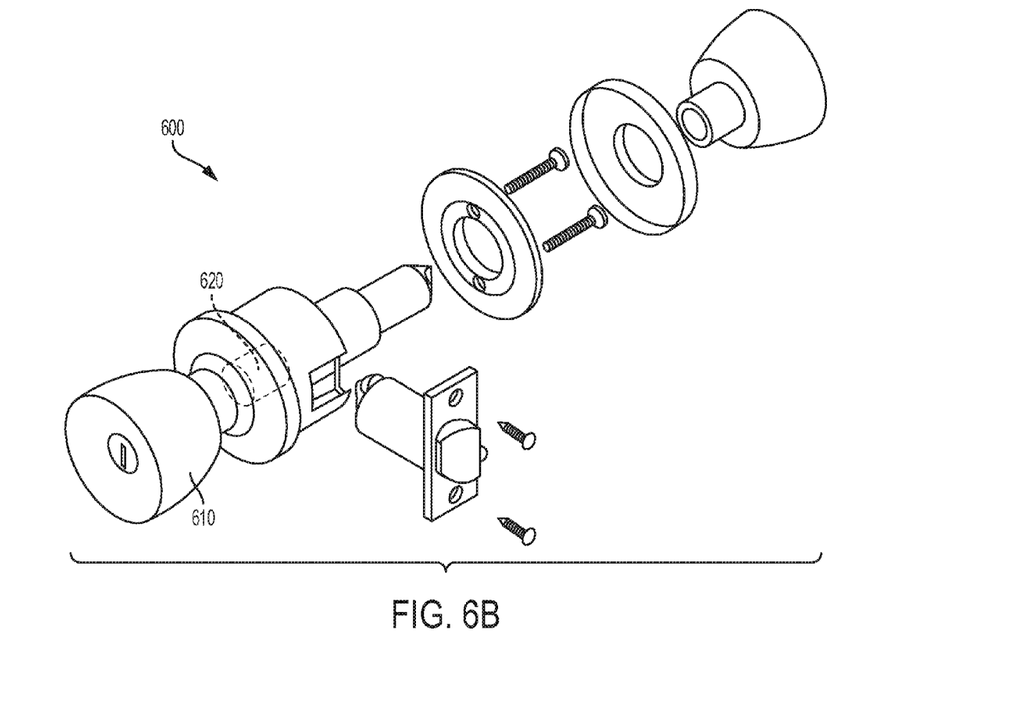

FIGS. 6A-6B show an example door handle 600 having a door knob 610 that can be grasped and turned by a person to open a door. Embedded within the door handle 600 is a haptic output module 620. The haptic output module 620 in this example includes rotary transducer that provides sensor signals to the haptic output module's processor indicating a rotation of the doorknob 610. The processor can then output one or more drive signals to the rotary transducer to cause the rotary transducer to rotate the doorknob to generate a kinesthetic effect 610, e.g., to resist turning of the doorknob. In this example, the haptic output module 620 comprises a battery, though in some examples, the haptic output module 620 may be connected to electrical wiring in the building. In some examples, rather than a rotary transducer, the doorknob may have a sleeve or patch overlaid on the doorknob to provide a contact sensor.

In some examples, the haptic output module may comprise a ferromagnetic material (e.g., iron or steel) disposed on or within a door latch and an electromagnet disposed within the door frame. To output the haptic effect, the haptic output module 620 may output a signal to cause the electromagnet to attract the door latch, thereby resisting movement of the door knob. Or in some examples, the haptic output module 620 may be configured to move the doorknob axially, e.g., to draw the doorknob away from, or to extend the doorknob towards, the person contacting the doorknob.

Figure 7A:
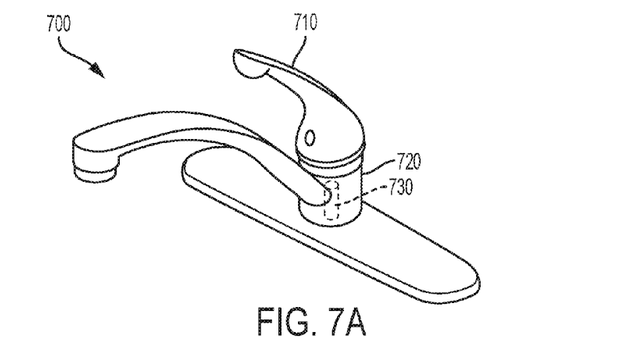
Figure 7B:
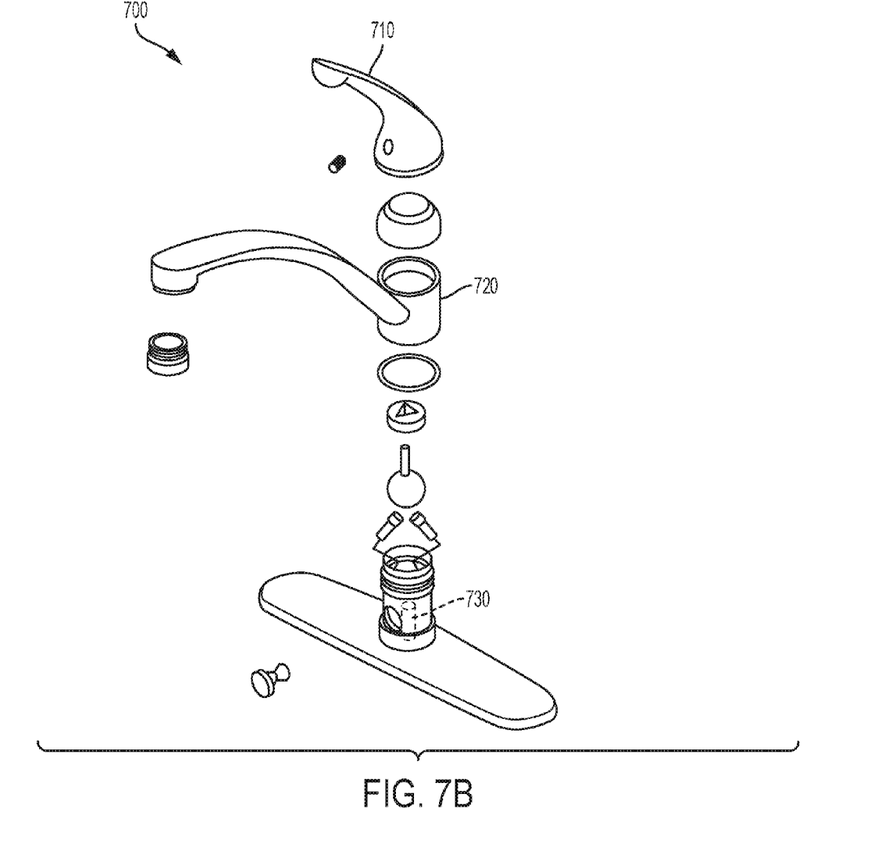

FIGS. 7A-7B illustrates an example water faucet 700. The water faucet 700 includes a handle 710 that a user can manipulate to turn the faucet on or off, by lifting or lowering the handle 710, respectively, or to change the temperature of the water, by rotating the faucet handle 710 left or right. The faucet includes a haptic output module 730 embedded in a base 720 of the water faucet 700. The haptic output module 730 in this example comprises a haptic output device that can resist or assist movement of the handle in one or more degrees of freedom. For example, the haptic output device may resist movement of the handle 710 in a direction selecting hot water if a hot water heater is turned off. In addition, the haptic output module 730 may also operate as a sensor module to provide sensor signals to the controller 110 to indicate a position of the faucet handle 710. However, in some examples, the faucet 700 may include a separate sensor module, or a sensor module may be connected to a water pipe connected to the water faucet 700 and be associated with the water faucet 700.

In some examples, the haptic output module 730 may be configured to affect water flow to the faucet without moving the handle 710. For example, the haptic output module 730 may output a signal to open or close a valve on a pipe leading to the faucet to change water flow through the faucet. For example, the haptic output module 730 may pulse, e.g., turn on and off five times each for a period of one second, the water flow to indicate a condition of a component of the building. Such an effect may indicate that water usage is higher than normal during the current month or billing cycle, or that water has been left running in another room in the building.

Figure 8A:
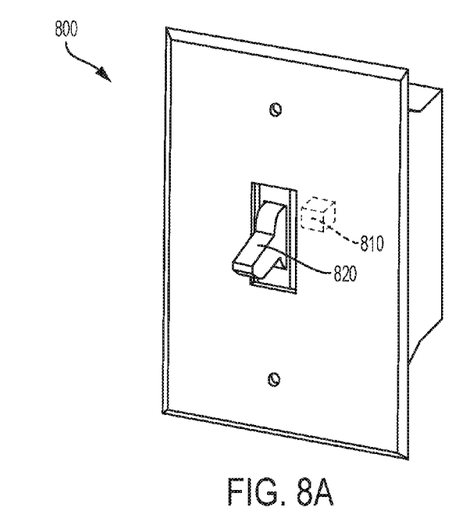
Figure 8B:
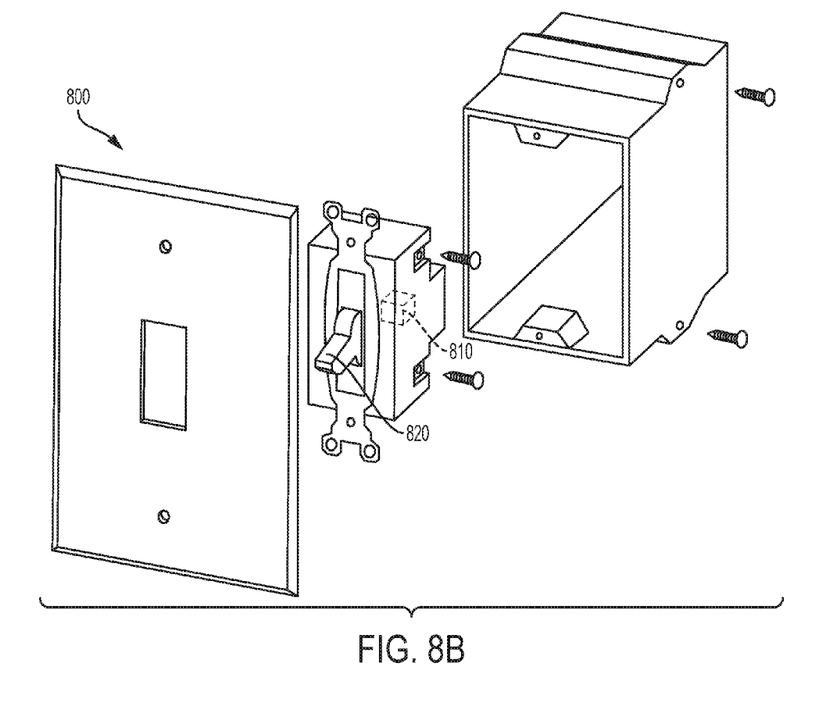

FIGS. 8A-8B show an example light switch module 800 having a light switch 810 and an embedded haptic output module 820. In this example, the haptic output module 820 also operates as a sensor module. The haptic output module 830 includes a current sensor to sense an amount of current passing through the switch. In addition, the haptic output module 820 includes a sensor to detect movement of the switch between throw positions. The haptic output module 820 also includes a vibrational haptic output device that can output vibration effects to the light switch 810. In some examples, the haptic output module 820 may also include a haptic output device that can output kinesthetic haptic effects, e.g., haptic effects to resist or assist movement of the light switch 810. Further, in some examples, the haptic output module may operate to retract or extend the light switch 810.

Figure 9A:
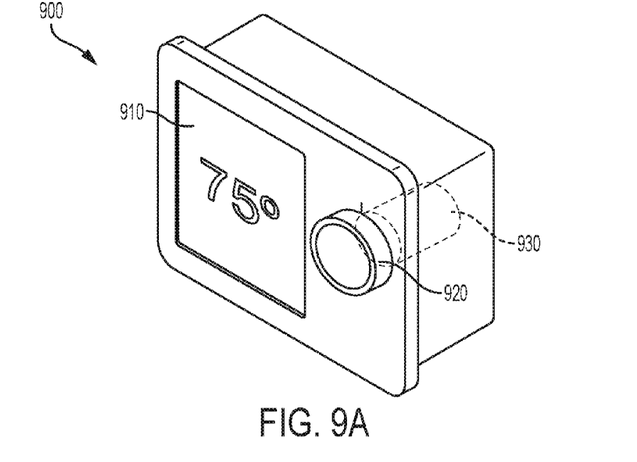
Figure 9B:
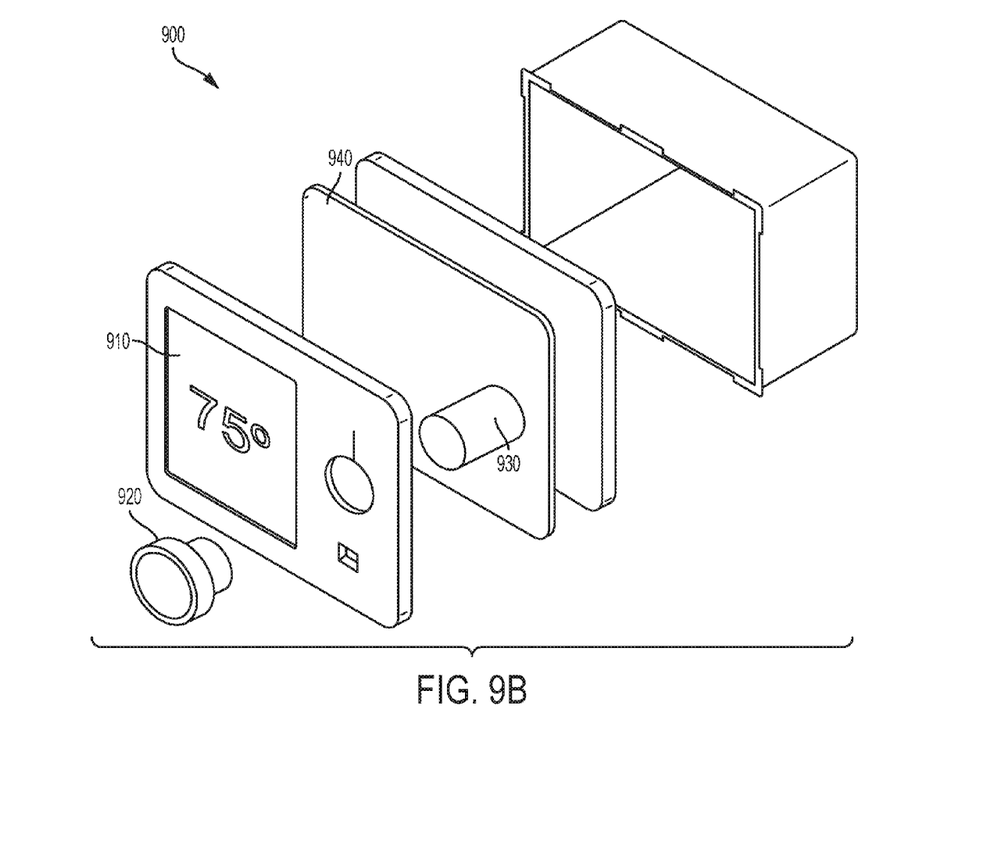

FIGS. 9A-9B show an example thermostat 900 for an HVAC system.

The thermostat 900 includes a touchscreen 910 and a dial 920 to allow a user to change a set temperature for the HVAC system or cycle through other options displayed on the touchscreen 910. The thermostat also includes a haptic output module 930 with two haptic output devices. One haptic output device comprises a rotary transducer that can output rotational haptic effects on the dial 920, but also sense a rotation of the dial 920. The haptic output module 930 is also in communication with an ESF output device 940 in communication with the touchscreen 910. Thus, the haptic output module 920 can output rotational haptic effects to the dial 920 or ESF-based effects to the touchscreen 910.

Figure 10:
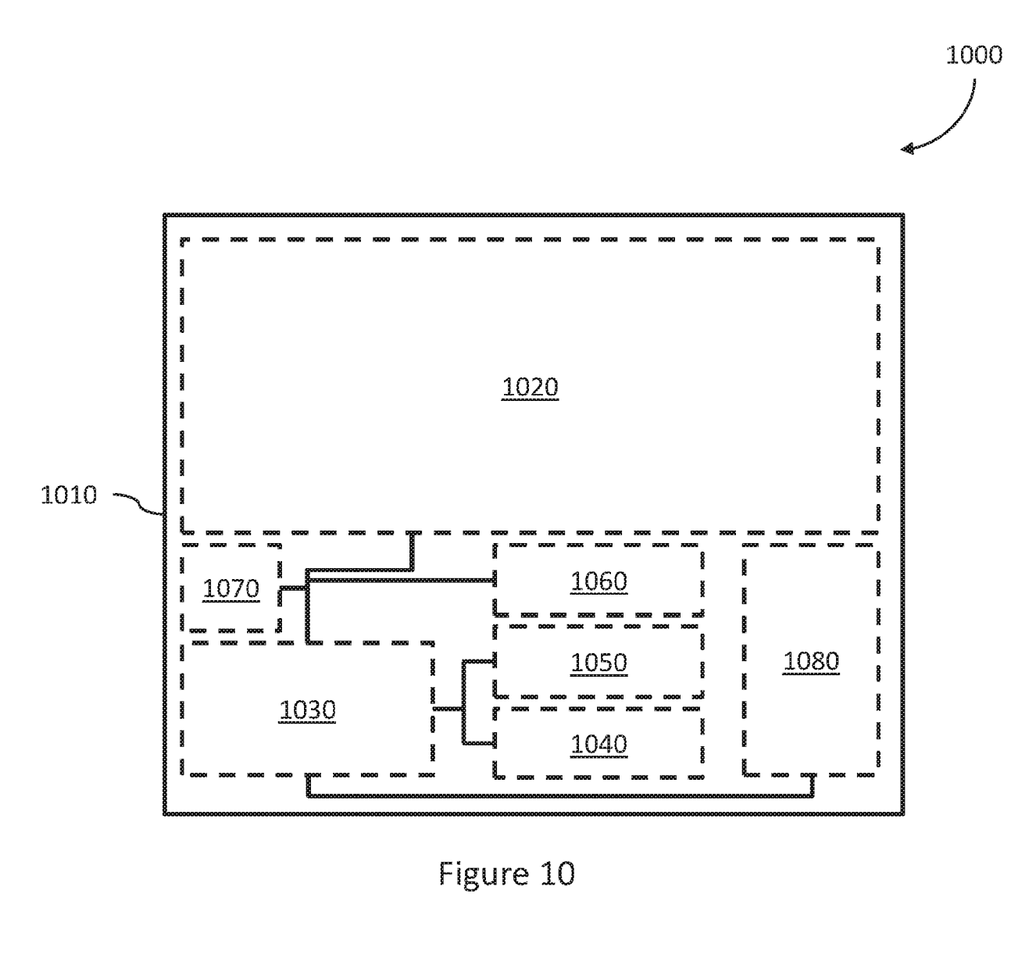
FIG. 10 shows an example controller for haptically-enhanced smart home architectures.

Referring now to FIG. 10, FIG. 10 illustrates an example controller 110 for haptically-enhanced smart home architectures. In the example shown in FIG. 10, the controller 1000 comprises a housing 1010, a processor 1030, a memory 1060, a touch-sensitive display 1020, a haptic output device 1040, one or more sensors 1050, one or more communication interfaces 1080, and one or more speakers 1070. The processor 1030 is in communication with the memory 1060 and, in this example, both the processor 1030 and the memory 1060 are disposed within the housing 1010. The touch-sensitive display 1020, which comprises or is in communication with a touch-sensitive surface, is partially disposed within the housing 1010 such that at least a portion of the touch-sensitive display 1020 is exposed to a user of the controller 1000. In some examples, the touch-sensitive display 1020 may not be disposed within the housing 1010. For example, the controller 1000 may be connected to or otherwise in communication with a touch-sensitive display 1020 disposed within a separate housing. In some example, the housing 1010 may comprise two housings that may be slidably coupled to each other, pivotably coupled to each other or releasably coupled to each other.

In the example shown in FIG. 10, the touch-sensitive display 1020 is in communication with the processor 1030 and is configured to provide signals to the processor 1030 or the memory 1060 and to receive signals from the processor 1030 or memory 1060. The memory 1060 is configured to store program code or data, or both, for use by the processor 1030, which is configured to execute program code stored in memory 1060 and to transmit signals to and receive signals from the touch-sensitive display 1020. In the example shown in FIG. 10, the processor 1030 is also in communication with the communication interface 1080 and is configured to receive signals from the communication interface 1080 and to output signals to the communication interface 1080 to communicate with other components or devices, such as one or more sensor modules 120a-c or haptic output modules 130a-c. In addition, the processor 1030 is in communication with haptic output device 1040, and is further configured to output signals to cause haptic output device 1040 to output one or more haptic effects. Furthermore, the processor 1030 is in communication with speaker 1070 and is configured to output signals to cause speaker 1070 to output sounds. In various examples, the controller 1000 may comprise or be in communication with fewer or additional components or devices.

The controller 1000 can be any device that is capable of receiving user input and executing software applications. For example, the controller 1000 in FIG. 10 includes a touch-sensitive display 1020 that comprises a touch-sensitive surface. In some examples, a touch-sensitive surface may be overlaid on the touch-sensitive display 1020. In other examples, the controller 1000 may comprise or be in communication with a display and a separate touch-sensitive surface. In still other examples, the controller 1000 may comprise or be in communication with a display and may comprise or be in communication with other user input devices, such as a mouse, a keyboard, buttons, knobs, slider controls, switches, wheels, rollers, joysticks, other manipulanda, or a combination thereof.

In various examples, the controller 1000 may comprise or be in communication with fewer or additional components than the example shown in FIG. 10. For example, in one example, the controller 1000 does not comprise a speaker 1070. In another example, the controller 1000 does not comprise a touch-sensitive display 1020, but comprises a touch-sensitive surface and is in communication with a display. Thus, in various examples, the controller 1000 may comprise or be in communication with any number of components, such as in the various examples disclosed herein as well as variations that would be apparent to one of skill in the art.

In some examples, the touch-sensitive display 1020 may comprise a multi-touch touch-sensitive display that is capable of sensing and providing information relating to a plurality of simultaneous contacts. For example, in one example, the touch-sensitive display 1020 comprises or is in communication with a mutual capacitance system. Some examples may have the ability to sense pressure or pseudo-pressure and may provide information to the processor associated with a sensed pressure or pseudo-pressure at one or more contact locations. In another example, the touch-sensitive display 1020 comprises or is in communication with an absolute capacitance system. In some examples, the touch-sensitive display 1020 may comprise or be in communication with a resistive panel, a capacitive panel, infrared LEDs, photodetectors, image sensors, optical cameras, or a combination thereof. Thus, the touch-sensitive display 1020 may incorporate any suitable technology to determine a contact on a touch-sensitive surface such as, for example, resistive, capacitive, infrared, optical, thermal, dispersive signal, or acoustic pulse technologies, or a combination thereof.

In the example shown in FIG. 10, haptic output device 1040 is in communication with the processor 1030 and is configured to provide one or more haptic effects. For example, in one example, when an actuation signal is provided to haptic output device 1040 by the processor 1030, the haptic output device 1040 outputs a haptic effect based on the actuation signal. For example, in the example shown, the processor 1030 is configured to transmit a haptic output signal to haptic output device 1040 comprising an analog drive signal. In some examples, the processor 1030 is configured to transmit a high-level command to haptic output device 1040, wherein the command includes a command identifier and zero or more parameters to be used to generate an appropriate drive signal to cause the haptic output device 1040 to output the haptic effect. In other examples, different signals and different signal types may be sent to each of one or more haptic output devices. For example, in some examples, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

Figure 11:
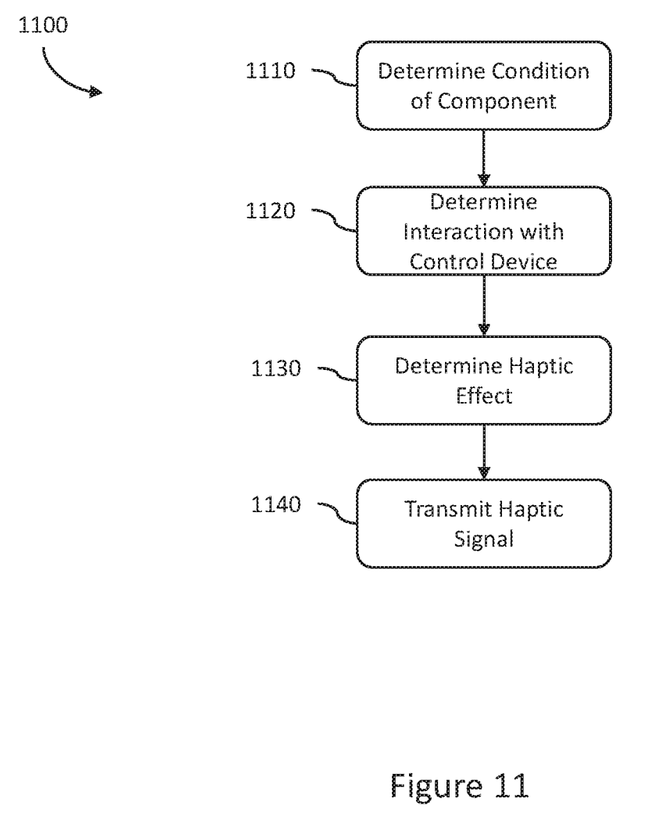
FIG. 11 shows an example method for haptically-enhanced smart home architectures.

Referring now to FIG. 11, FIG. 11 shows an example method 1100 for haptically-enhanced smart home architectures. The method 1100 shown in FIG. 11 will be described with respect to the system 100 shown in FIG. 1, however it should be appreciated that this example method 1100, and other methods according to this disclosure, may be performed by other example systems according to this disclosure.

At block 1110, the controller 101 determines a condition of a component of a building. As discussed above, components may be any of a variety of things, such as doors or windows, both interior or exterior; light switches; lights; appliances, such as stoves, ovens, refrigerators, etc.; or televisions or home theater equipment, an HVAC system; an alarm system; or a plumbing system, e.g., one or more faucets, toilets, showers, etc. To determine a condition of a component, the controller 110 accesses sensor information about the component.

As discussed above, the controller 110 is in communication with one or more sensor modules 120*a-c* within the building (or site) and receives sensor information from the sensor modules 120*a-c*. Each sensor module 120*a-c* may be associated with one or more components 140-160, and each component 140-160 may have one or more associated sensor modules 120*a-c*. A sensor 120*a-c* may provide sensor information about an associated component periodically or continuously, or it may store sensor information locally within a memory, e.g., memory 220, which may be requested or otherwise accessed by the controller 110.

Depending on the type of sensor 120*a-c* and the associated component 140-160, the controller 110 may determine a condition of the component in a variety of different ways. For example, a window or a door component may have a binary state—open or closed—or it may have a range of states associated with a degree of openness. In one example, a sensor module for a window or door comprises an electromagnetic proximity sensor having two portions that are in close proximity when the door or window is closed, but are moved apart when the door or window opens. Such a sensor may provide a binary signal based on whether the two portions of the sensor are close enough to each other to maintain a circuit-style connection. In some examples, however, a sensor on a window may comprise a variable resistor, e.g., a rheostat, whose resistance changes based on how far open the window is. Other example sensors include rotary encoders that may detect a movement or a position of a hinge on a door or window, or a position of a crank mechanism on a window. The controller 110 may access such sensor information and determine based on the sensor signal whether the corresponding door or window is open, or a degree to which the door or window is open.

Other types of sensors may detect current or voltage, and may be associated with components that draw electricity when powered on. For example, a current sensor may be in communication with an appliance and detect an amount of current drawn by the appliance. The current level may be transmitted to the controller 110, which may determine a state of the appliance. For example, some components draw no current when powered off, e.g., a light switch may completely break a circuit connection in one position. Thus, if the controller 110 detects a non-zero current associated with a light switch, it may determine that the condition of the light switch is "ON," while if no current is detected, the controller 110 may determine that the condition of the light switch is "OFF." In some examples, e.g., for a dimmer switch, the controller 110 may determine a condition as a degree to which a switch is "ON," e.g., based on a learned range of current draws for the switch.

Some example components, however, may draw current even when powered off. For example, home theater equipment frequently draws current, even when powered off. Thus, the controller 110 may obtain current information from one or more sensor modules 120*a-c* associated with home theater equipment. The controller 110 may then compare the sensed current information against an expected current draw in an "OFF" state. If the sensed current is within a predetermined range of the expected "OFF" current draw, e.g., within 1-5% in this example, the controller 110 may determine that the component associated with the sensor module 120*a-c* is off.

In some examples, the controller 110 may learn an expected OFF current draw over time based on feedback, e.g., from a user. For example, the controller 110 may initially provide a notification that a stereo receiver is on based on a detected non-zero current. The user may dismiss the notification and indicate to the controller 110 that the stereo receiver is powered off. The controller 110 may then record an "OFF" state current draw value for the stereo receiver. Such a value may be updated or averaged over time to provide a more accurate determination of the state of the stereo receiver.

It should be appreciated that while specific examples of binary states and ranges of states were described above, other components may similarly have such binary states or a range of states, discrete or continuous, that may be sensed in different examples. Further, states may include states such as those discussed above, e.g., ON or OFF, or OPEN or CLOSED, or other states applicable to the component being used. In some examples, states may include states of systems, such as alarm systems. For example, an alarm system may have different alarm states, such as "disarmed," "armed," "armed home," "armed away," etc.

At block 1120, the controller 110 determines an interaction with a control device. As discussed above, control devices relate to devices that can be used by a user to control the state of a component, such as door knobs, faucets, toilet handles, light switches, thermostats. These or other control devices may have an associated haptic output module that can sense an interaction with the control device. To determine an interaction with a control device, the controller 110 accesses information from a sensor 120*a-c* or a haptic output module 130*a-c* associated with the control device. For example, a sensor 120*a-c* may provide one or more sensor signals indicating that a state of a device is changing. For example, a sensor 120*a-c* may transmit a sensor signal to the controller 110 indicating that a state of the component has changed, e.g., a window has changed from a CLOSED state to an OPEN state. The controller 110 may determine that the change of state indicates an interaction with a control device.

In some examples, a sensor, e.g., in a haptic output module, may detect a contact with a control device. For example, as discussed above, a haptic output module may include a touch sensor, and may receive a sensor signal from the touch sensor in response to a person touching the touch sensor. Referring again to FIG. 6A, a touch sensor associated with the doorknob 610 may transmit a sensor signal to the haptic output module 620. The haptic output module 620 may then transmit a signal to the controller 110 indicating that touch was sensed on the doorknob 610. The controller 110 may then determine that a person is touching the doorknob 610 based on the received sensor signal. Or in some examples, the sensor may comprise a rotary encoder that senses a rotation of the doorknob 610 and transmits a sensor signal to an associated haptic output module indicating a rotation of the doorknob and, in some examples, a degree of rotation of the doorknob. The haptic output module may then transmit a signal to the controller 110 indicating rotation of the doorknob.

While contact may indicate an interaction with a control device, in some examples, a haptic output module 130*a-c* may detect proximity of a person to the control device. For example, the haptic output module 130*a-c* may include a proximity sensor, such as a motion detector. When the motion detector indicates movement, the controller 110, or the haptic output module 130*a-c*, may attempt to communicate with a device carried by or worn by the nearby person. For example, the controller 110 or the haptic output module 130*a-c* may attempt to pair with a user's smartwatch or smartphone.

In some examples, an intent may be determined based on an interaction. For example, a user turning an interior doorknob on an exterior door may indicate that the person intends to leave the building. Further, the interaction in conjunction with other condition information may provide additional information regarding intent. For example, if a person rotates an interior doorknob on an exterior door and an alarm system countdown timer is active, it may indicate that the person intends to leave the building for an extended period of time. Such intent information may then be used, e.g., to determine that the oven is on and the person may have left it on unintentionally. More generally, the controller 110 may determine an activation state of a component of the building, e.g., turning on an alarm system or an HVAC system, or turning a doorknob to leave the building, etc., that is incompatible or undesirable with a state of the building, e.g., a door or window is open, or the stove was left on. In some such examples, the controller 110 may determine the incompatibility and, at block 1130, determine a haptic effect based on the incompatibility.

While the features related to block 1120 have been described with respect to the controller 110, it should be appreciated that a haptic output module associated with a control device may determine an interaction with the control device instead of, or in addition to, the controller 110. In some examples, after determining the interaction, the haptic output module may transmit a signal to the controller 110 indicating the interaction.

At block 1130, the controller 110 determines a haptic effect based on the condition of the component of the building. In this example, the controller 110 determines haptic effects to notify the person interacting with the control device of the condition of the component of the house. For example, in the context of a house, the controller 110 may have determined that a window in the building is open at block 1110, and that a user is interacting with the doorknob 610 on the inside of the front door of the house. The controller 110 determines that the user is likely intending to leave the house while the window is open. The controller 110 then determines a haptic effect to indicate that a condition in the house should be addressed by the person before they leave. In this example, the controller 110 then selects a haptic effect to resist movement of the doorknob 610 from a library of available haptic effects. In this example, the selected haptic effect is associated with rotatable doorknobs and is designed to be output as a rotation in a direction.

Different haptic effects may be provided within a haptic effect library, e.g., stored in the controller's memory or on a network location (e.g., in the cloud). Correlations between haptic effects in the haptic effect library and one or more detected conditions may be dynamically determined by the controller, or may be pre-established by a person, e.g., a homeowner or building tenant.

Further, it should be appreciated that the strength, duration, type, etc., of a determined haptic effect may be based on a detected use of the control device. For example, if a person is turning a doorknob quickly, a stronger haptic effect may be output, e.g., a stronger resistive haptic effect or a stronger vibration. Or, in the context of a light switch, the controller 110 may determine energy usage for the month is significantly greater than usual, and determine haptic effect having a high magnitude for strongly resisting movement of a light switch, whereas when energy usage is only slightly higher than usually, a lower magnitude resistive effect may be determined.

Referring again to FIG. 7A, in this example, the controller 110 previously determined a state of a toilet in the house as running for longer than 30 seconds, which may indicate a poor seal or leak in the toilet. Upon determining a person attempting to turn on the faucet 700 using the faucet handle 710 at block 1120, the controller 110 determines a haptic effect to notify the person of the running toilet. The controller 110 then selects a haptic effect from a library of available haptic effects associated with faucets. In this example, the controller 110 selects a haptic effect to resist turning on the faucet to indicate running water elsewhere in the house. In some examples, the controller 110 may further determine a haptic effect to indicate the component of the house associated with the running water. For example, the controller 110 may select a haptic effect based on the component being a toilet, which in this case corresponds to a single pulsed vibration. Thus, the controller 110 selects two haptic effects: a resistance effect to resist turning the faucet on to indicate running water in the house, and a vibrational effect to indicate that the running water is associated with a toilet.

With respect to the light switch 800 shown in FIG. 8A, the controller 110 may have determined that home theater equipment in a room is powered on at block 1110, and that a user is attempting to turn off the lights in the room using the light switch 800. The controller 110 may determine a vibrational haptic effect to indicate that the home theater system is powered on. In this example, the user's intent may be ambiguous: the user may be turning off the lights to leave the room or to improve the viewing environment for a movie. Thus, the controller 110 determines a vibration type effect rather than a resistive haptic effect.

In some examples, resistive haptic effects may be determined and used when the controller 110 determines that user action is needed, e.g., to close a window or to turn off the oven. However, vibrational haptic effects may be determined and used to provide a notification to a person, but does not indicate that action is necessarily needed.

While some of the examples above relate to the controller 110 determining a haptic effect, in some examples, the controller 110 may instead provide to the haptic output module a state of one or more components of the building and the haptic output module may then determine the haptic effect to be output, such as using the techniques described above.

In some examples, the controller 110 or the haptic output module 130a-c may also, or instead, determine a haptic effect that may be sent to a device carried or worn by one or more people. For example, a user may wear a smartwatch or carry a smartphone. In one such example, the controller 110 may determine one or more haptic effects supported by the user's wearable device and may determine a haptic effect based on the haptic effects supported by the user's wearable device.

Further, as discussed above, the controller 110, in some examples, may determine a haptic effect based on a detected activation state of a component of a building, and a condition of the building. As discussed above with respect to block 1120, the building may detect that a window of a building is open and that an HVAC system is powering on to cool the building. The controller 110 may determine an incompatibility between running the HVAC system while allowing the cool air to escape via the open window, and determine a haptic effect to notify a user of such a condition.

At block 1140, the controller 110 transmits a signal to the haptic output device to cause the haptic output device to output the haptic effect. In this example, the controller 110 transmits a signal comprising an identification of a haptic effect to be output to the haptic output module associated with the control device associated with the interaction determined at block 1120. The haptic output module receives the signal identifying the haptic effect to be output, determines one or more drive signals based on the identified haptic effect, and outputs the haptic effect using the haptic effect device, e.g., haptic effect device 350. For example, the haptic output module maintains in its memory a table having entries with parameters for drive signals associated with different haptic effects. In response to receive a signal identifying a haptic effect, the haptic output module searches the table for an entry corresponding to the identified haptic effect, and generates and outputs a haptic effect using the haptic effect device based on the parameters in the table entry. However, in some examples, the controller may transmit parameters usable by the haptic output module to generate the drive signal, such as a magnitude, duration, waveform, etc.

In some examples, the controller 110 may transmit a signal to use the haptic output module 130a-c to output non-haptic effects, such as pulsing water flow from a faucet to indicate excess water usage or a water leak. In some examples, such as those described above, the haptic output module may determine the haptic effect. In some such examples, the processor 310 of the haptic output module may then transmit a signal to the haptic output device 350 to cause the haptic output device 350 to output the haptic effect.

As discussed above, in some examples, the controller 110 may transmit a signal to a person's wearable device or smartphone. For example, if condition of a component of the building indicates an urgent condition, the controller 110 may transmit a signal to the person's wearable device. Or in some examples, as discussed above, a haptic output module 130a-c may detect a person in proximity to the haptic output module 130a-c. In such an instance, the controller 110 may transmit the signal to the user's wearable device or smartphone, rather than the haptic output module 130a-c. For example the person may not be contacting a control device associated with the haptic output module 130a-c. Thus it may not be possible to output a haptic effect to the person using a haptic output device of the haptic output module 130a-c. In some examples, rather than the controller 110 transmitting the signal to the person's wearable device or smartphone, the controller 110 may transmit the signal to the haptic output module 130a-c, which may then transmit the signal, or another signal based on the signal, to the person's wearable device or smartphone. Such a signal may also be transmitted with information, or another signal, that may output visual status information on a display screen of the person's wearable device or smartphone.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

That which is claimed is:

1. A method comprising:
   receiving a sensed condition of a building system component of a building from a sensor corresponding to the building system component, the building system component activatable by a user;
   receiving an indication of an interaction with a control device of the building from the control device, the control device associated with the building system component and comprising a haptic output device;
   in response to receiving the indication of the interaction with the control device of the building:
      determining a haptic effect based on the sensed condition and the control device; and
      transmitting a signal to the control device to cause the haptic output device to output the haptic effect.

2. The method of claim 1, wherein the control device is configured to change a state of the building system component.

3. The method of claim 1, wherein:
   the sensed condition comprises an activation state of the building system component; and
   determining the haptic effect is based on an incompatibility of a building state with the activation state of the building system component.

4. The method of claim 1, wherein the control device comprises a light switch, a door knob, a door handle, an alarm system control panel, or an HVAC control panel.

5. The method of claim 1, wherein the haptic effect comprises a kinesthetic haptic effect.

6. The method of claim 1, wherein the interaction comprises a manipulation of an input device of the control device.

7. The method of claim 6, wherein determining the haptic effect is further based on a type of the input device.

8. A system comprising:
a sensor corresponding to a building system component of a building, the building system component activatable by a user;
a control device associated with the building system component and comprising a haptic output device;
a memory; and
a processor in communication with the memory, the sensor, and the control device, the processor configured to execute processor-executable instructions stored in the memory to:
 receive a sensed condition from the sensor;
 receive an indication of an interaction with the control device from the control device;
 in response to receipt of the indication of the interaction with the control device of the building:
  determine a haptic effect based on the sensed condition and the control device; and
  transmit a signal to the control device to cause the haptic output device to output the haptic effect.

9. The system of claim 8, wherein the control device is configured to change a state of the building system component.

10. The system of claim 8, wherein the sensed condition comprises an activation state of the building system component; and
wherein the processor configured to execute processor-executable instructions stored in the memory to determine the haptic effect based on an incompatibility of a state of the building with the activation state of the building system component.

11. The system of claim 8, wherein the control device comprises a light switch, a door knob, a door handle, an alarm system control panel, or an HVAC control panel.

12. The system of claim 8, wherein the haptic effect comprises a kinesthetic haptic effect.

13. The system of claim 8, wherein the interaction comprises a manipulation of an input device of the control device.

14. The system of claim 13, wherein the processor configured to execute processor-executable instructions stored in the memory to determine the haptic effect further based on a type of the input device.

15. A non-transitory computer-readable medium comprising processor-executable program code configured to cause a processor to:
 receive a sensed condition of a building system component of a building from a sensor corresponding to the building system component;
 receive an indication of an interaction with a control device of the building from the control device, the control device associated with the building system component and comprising a haptic output device;
 in response to receipt of the indication of the interaction with the control device of the building:
  determine a haptic effect based on the sensed condition and the control device; and
  transmit a signal to the control device to cause the haptic output device to output the haptic effect.

16. The non-transitory computer-readable medium of claim 15, wherein the control device is configured to change a state of the building system component.

17. The non-transitory computer-readable medium of claim 15, wherein the sensed condition comprises an activation state of the building system component; and
wherein the processor-executable program code is further configured to cause the processor to determine the haptic effect based on an incompatibility of a state of the building with the activation state of the building system component.

18. The non-transitory computer-readable medium of claim 15, wherein the haptic effect comprises a kinesthetic haptic effect.

19. The non-transitory computer-readable medium of claim 15, wherein the interaction comprises a manipulation of an input device of the control device.

20. The non-transitory computer-readable medium of claim 19, wherein the processor-executable program code is further configured to cause the processor to determine the haptic effect further based on a type of the input device.

* * * * *